Patented Oct. 12, 1926.

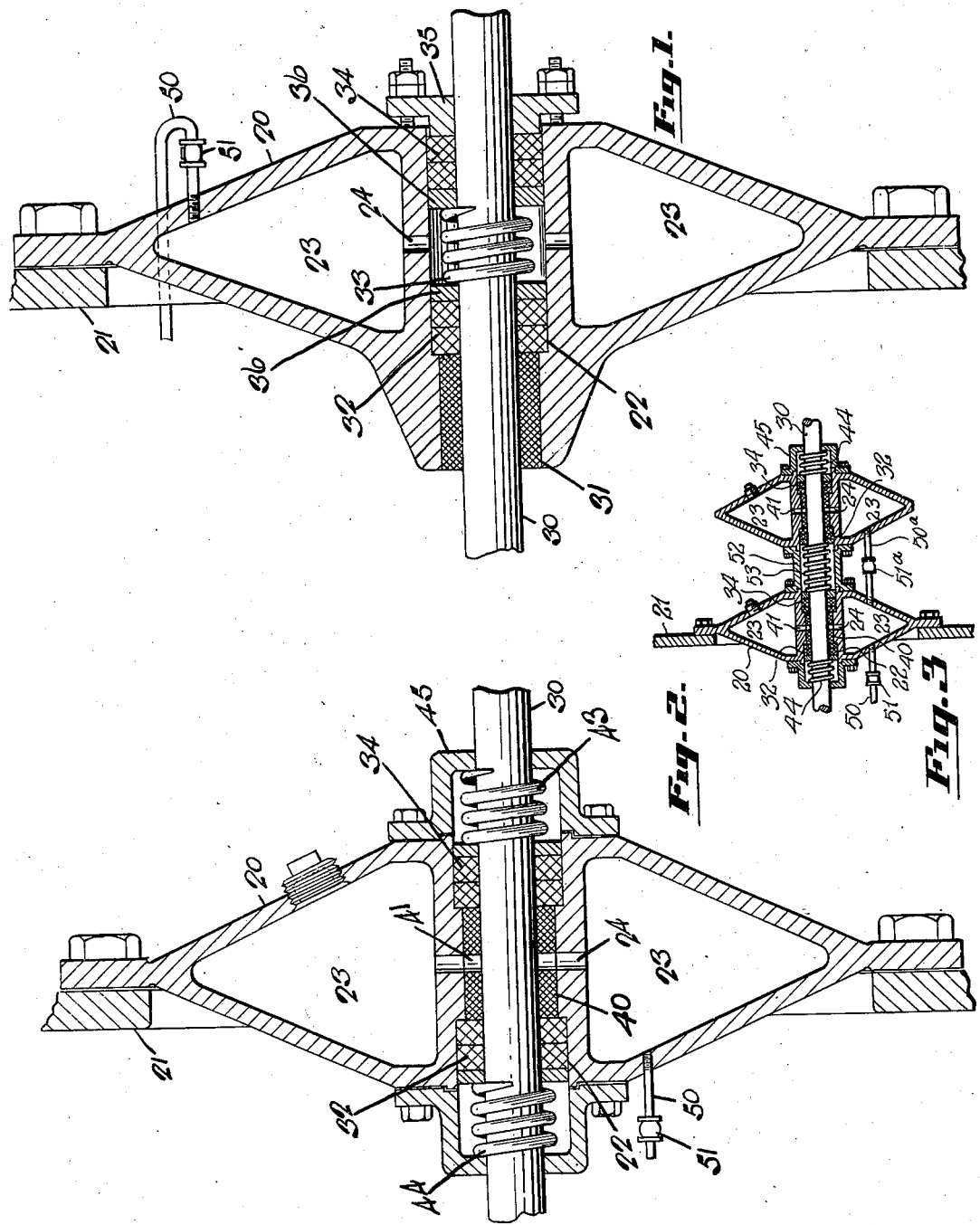

1,603,206

UNITED STATES PATENT OFFICE.

HARRY B. HULL, OF DAYTON, OHIO, ASSIGNOR, BY MESNE ASSIGNMENTS, TO GENERAL MOTORS RESEARCH CORPORATION, OF DAYTON, OHIO, A CORPORATION OF DELAWARE.

STUFFING BOX.

Application filed October 15, 1920. Serial No. 417,190.

The present invention relates to stuffing boxes and more particularly to stuffing boxes to be used on rotary drive pumps and the like, preferred forms of which have been chosen as convenient for the purposes of description and explanation.

In pumps and compressors, particularly those employed in compressing the volatile fluids used in mechanical refrigerating systems, considerable difficulty has been experienced in the leakage of fluid through the stuffing box around the drive shaft. The difficulty arises from the fact that the pressures vary greatly in compressors used for refrigeration purposes, being high when the compressor is at rest and relatively low when the compressor is running, in some cases being at atmospheric pressure or lower. Obviously a stuffing box with sufficient pressure upon the packing to prevent leakage when the compressor is at rest and the pressure therein is high will result in too much friction by the packing upon the drive shaft when the compressor is in operation and the pressure is low, and likewise a packing adjusted for efficient operation when the compressor is running will not withstand the pressure when it is at rest.

It is among the objects of the present invention therefore to provide a stuffing box which is adapted to prevent leakage of fluid therethrough under all conditions and which exercises a minimum of friction upon the drive shaft for which it is provided.

With this object in view the invention consists broadly in the provision of a leakage chamber about the drive shaft and its double packings, the leakage chamber being in communication with the space between the packings, and having a direct one-way connection with the interior of the compressor casing, without the interposition of pumps or pressure equalizing means.

Further objects and advantages of the present invention will be apparent from the following description, reference being had to the accompanying drawing, wherein preferred embodiments of the present invention are clearly shown.

In the drawings:

Fig. 1 is a sectional view of a stuffing box showing the leakage chamber and means between the sets of packing for exerting pressure thereupon.

Fig. 2 is a sectional view of another form of stuffing box wherein pressure is exerted upon the sets of packing from the outside.

Figure 3 is a sectional view showing two stuffing boxes of the type shown in Figure 2 arranged in series.

In the embodiments of the invention illustrated, 20 represents a support which may be attached to the casing 21 of a refrigerating pump or compressor. The drive shaft 30 of the compressor extends through an elongated circular passage 22 in the support 20, the passage being provided with a suitable bearing member therein for the shaft and suitable packing means or seals 32 and 34.

Referring particularly to Figure 1, the bearing member is shown at 31 and is located at the inner end of passage 22, permitting a packing or seal 32 to be inserted in the portion of the passage 22 beyond the bearing 31.

Suitable means for exerting pressure upon the packing 32, preferably a spring 33 is inserted between this packing and a similar packing or seal 34, also in the passage 22. An adjustable gland 35 is provided to hold the packings 32 and 34 in place and is adapted to adjust the pressure of the spring 33 upon the packing. Between the spring 33 and the two sets of packing are provided washers 36 for taking the wear of the spring off the packing. Formed in the support 20 and concentric with the passage 22 is a leakage chamber 23 of substantial capacity, the chamber being connected with the space between the packings 32 and 34 by means of radial apertures 24.

Fig. 2 has its bearing member 40 provided in the center of the passage 22. This bearing member has a series of holes 41 to correspond with the holes 24 to the leakage chamber. Similar packings 32 and 34 are provided on each side of the bearing member in the passage 22. Each packing in this case has separate means for exerting pressure thereupon, which as shown in Fig. 2, are preferably springs 43 and 44. Suitable caps 45 are provided to hold these springs in place.

The leakage chamber is provided with a return pipe 50 connecting the chamber to the low side of the compressor, and this pipe is provided with a check valve 51 permitting flow of fluid from the leakage chamber to the low side. As shown in Fig. 1, the check valve is placed preferably external to the compressor where it is accessible for repair at all times. However, conditions may be such that it would be desirable to have the check valve within the compressor as shown in Fig. 2.

In the ordinary household refrigerating system, when the compressor has been shut down, the pressure will equalize on the high and low side, that is, the pressure will rise in the compressor casing 21, and great pressure will be exerted on the packings 32 and 34 in the passage 22. Some of the refrigerant and some lubricant may leak through the inside packing 32 around the drive shaft 30. This leakage is due to the fact that only a small pressure is exerted upon the packing by the spring so that during operation no injurious binding upon the drive shaft will result. This leakage however, goes into the leakage chamber 23 through the passages 24 hereinbefore described. It has been found where there is from twenty to thirty pounds pressure within the compressor as in a sulphur dioxide machine, that after a shut down of one hour, which is a good average, there will be a pressure of not more than two to three pounds built up within the leakage chamber. It is evident that as the pressure builds up within the leakage chamber, there will be less tendency for further leakage to occur by reason of the smaller difference in pressure between the compressor and the leakage chamber. Further, in the embodiment of the invention illustrated in Fig. 1, the pressure in the leakage chamber actually supplements the pressure of the spring 33, thereby increasing the pressure on the packings 32 and 34 and further reducing the likelihood of leakage either from the compressor to the leakage chamber or from the leakage chamber to the atmosphere. Upon starting the compressor again, the pressure within the low pressure side of the compressor will drop to approximately zero, that is, atmospheric pressure, causing the refrigerant or lubricant in the leakage chamber to return to the compressor through the pipe 50 and check valve 51.

In the case of an ammonia refrigerating compressor and other similar compressors wherein the operating pressures are higher than in the above example of the sulphur dioxide machine, the higher pressure which would result in the leakage chamber, might be sufficient to cause a leakage from the chamber through the packing 34 to the atmosphere. This situation can be overcome by a series of leakage chambers separated by packings held in place by spring members similar to 33. Thus a decrement of pressures for each succeeding leakage chamber will result, which will leave for the outer leakage chamber a pressure low enough to be unable to cause a leakage of fluid to the atmosphere. The return pipes in this case will run from the outer chamber to the next and so on to the low side of the compressor. A separate check valve will be provided for each pipe to permit the flow of fluid inwardly.

The general arrangement of such leakage chambers in series is illustrated in Figure 3 in which two such chambers as are shown in Figure 2 are arranged in series, the right-hand cap 45 of one of said chambers and the left-hand cap of the other being removed and the two chambers connected together by a hollow sleeve 52, Figure 3. In providing for the use of two such chambers, a spring 53, similar, as above stated, to the spring 33, will be employed to press the two packings 34 and 32; the spring, as a matter of course, being of such a length as to properly compress said packings when the cases are held together by a sleeve 52 of the length employed for connecting the cases. In such an arrangement of the parts the return pipe 50$^a$ leading from the outer chamber communicates with the inner chamber; a suitable check valve 51$^a$ being included in the said pipe and the inner chamber is connected with the interior of the compressor through a pipe 50 and check valve 51 precisely as shown in Figure 2 of the drawing. Inasmuch as Figure 3 shows two such leakage chambers as are shown in Figure 2, modified only by the omission of the caps 45 at the adjacent ends of the chambers and the substitution therefor of the sleeve 52 and spring 53, the same reference numerals are applied to Figure 3 as are applied to the form of leakage chamber shown in Figure 2.

Thus it is evident that a stuffing box has been provided wherein there is very little pressure exerted upon the packing; which is very simple in structure and operation; and which will prevent the loss of fluid therethrough to the atmosphere.

Although the adaptation of the stuffing box to a compressor for refrigerating systems has been referred to at numerous places throughout the specification, it is to be understood that the invention is not limited to this particular type of pump or system therefor. It is quite evident that this form of stuffing box is adapted to be used on any type of pump, or in any system whereby a rotary drive is utilized.

While the forms of mechanism herein shown and described, constitute preferred embodiments of one form of the invention, it is to be understood that other forms might be adopted and various changes and alterations made in the shape, size, and proportion of the elements therein without departing from the spirit and scope of the invention.

What I claim is as follows:—

1. In a fluid circulating system, the combination with a casing, of a support in the wall thereof; a shaft passing therethrough; a plurality of spaced packings between the shaft and the support; a plurality of leakage chambers, one of said leakage chambers being in communication with the space between each pair of adjacent packings; and means including check valves for connecting adjacent leakage chambers with each other, and for connecting the inner leakage chamber direct with the interior of the casing.

2. In a fluid circulating system, the combination with a casing, of a support in the wall thereof having an elongated passage there through, a shaft passing through said passage, a plurality of bearings for said shaft, packing for said shaft at the ends of each bearing, a leakage chamber surrounding each bearing, each bearing provided with an opening for connecting said passage with said leakage chamber; means including check valves for connecting adjacent leakage chambers with each other, and for connecting the inner leakage chamber directly with the interior of the casing.

In testimony whereof I hereto affix my signature.

HARRY B. HULL.